(12) United States Patent
Huang (10) Patent No.: US 6,388,352 B1
(45) Date of Patent: May 14, 2002

(54) MAGNETICALLY ACTUATED ROTARY APPARATUS

(76) Inventor: Yung-Chi Huang, 5F, No. 166, Sec. 2, Keelung Rd., Taipei (TW)

( * ) Notice: Subject to any disclaimer, the term of this patent is extended or adjusted under 35 U.S.C. 154(b) by 0 days.

(21) Appl. No.: 09/789,772

(22) Filed: Feb. 22, 2001

(51) Int. Cl.$^7$ .............................................. H02K 21/00
(52) U.S. Cl. .............. 310/152; 310/154.33; 310/156.01
(58) Field of Search ........................... 310/152, 154.03, 310/154.06, 154.11, 154.12, 154.13, 154.25, 154.32, 154.33, 154.36, 156.01, 156.19, 156.24, 156.59, 89, 91

(56) References Cited

U.S. PATENT DOCUMENTS

| | | | | |
|---|---|---|---|---|
| 3,895,245 A | * | 7/1975 | Bode | 310/46 |
| 3,967,146 A | * | 6/1976 | Howard | 310/80 |
| 5,903,069 A | * | 5/1999 | Hiterer | 310/15 |
| 6,184,605 B1 | * | 2/2001 | Kim | 310/156 |
| 6,213,737 B1 | * | 4/2001 | Murakami et al. | 417/423.4 |
| 6,274,959 B1 | * | 8/2001 | Uchiyama | 310/152 |

* cited by examiner

Primary Examiner—Nestor Ramirez
Assistant Examiner—Thanh Lam (57) ABSTRACT

A magnetically actuated rotary apparatus includes a casing, a supporting frame, a central shaft, a rotor assembly, an outer actuating assembly, and an actuating device. The rotor assembly is coupled with the central shaft and rotatable with the central shaft about a central axis of the central shaft. The rotor assembly is provided with a plurality of fixed rotor magnets supported by a fixed rotor magnet supporting mechanism to the rotor assembly. Each of the fixed rotor magnets has an inclined angle with respect to the central axis of the central shaft. An outer actuating assembly is arranged around the rotor assembly, comprising a plurality of movable outer magnets spaced by baffle plates from each other. The movable outer magnet is formed with an inclined angle correspondingly opposite to the fixed rotor magnet mounted on the rotor assembly. The actuating device is mechanically coupled to the outer actuating assembly for moving the movable outer magnets of the outer actuating assembly toward or backward the fixed rotor magnets of the rotor assembly so as to magnetically actuate the rotor assembly to rotate.

6 Claims, 8 Drawing Sheets

MAGNETICALLY ACTUATED ROTARY APPARATUS

BACKGROUND OF THE INVENTION

1. Field of the Invention

The present invention relates to a rotary apparatus, and more particularly to a magnetically actuated rotary apparatus, which mainly includes a rotor assembly, an outer actuating assembly, and an actuating device mechanically coupled to the outer actuating assembly for moving the outer actuating assembly toward or backward the rotor assembly so as to magnetically actuate the rotor assembly to rotate.

2. Description of the Prior Art

Various magnetically controlled devices or rotary apparatuses are developed in the past. For example, in an electric induction motor, an alternative electro-magnetical force is generated between a rotor and a stator of the induction motor, thereby rotating the rotor in a direction according to the rotating direction of the electro-magnetical force. A shaft is mechanically coupled to the rotor, and therefor the shaft can actuate a mechanical load to rotate.

However, the rotation of the conventional motor is actuated by an electromagnetic field by supplying a lot of electrical powers to the stator of the rotary apparatus. In fact, the magnet elements itself have a large magnetic energy enough to generate a rotation if the magnet elements are well arranged.

Thus, it is desirable to provide an improved rotary apparatus actuated by magnetic force to meet the requirements above.

SUMMARY OF THE INVENTION

Consequently, a primary object of the present invention is to provide an improved rotary apparatus which is actuated by means of magnetic force.

The other object of the present invention is to provide a magnetically actuated rotary apparatus, which mainly includes a rotor assembly, an outer actuating assembly, and an actuating device mechanically coupled to the outer actuating assembly for moving the outer actuating assembly toward or backward the rotor assembly so as to magnetically actuate the rotor assembly to rotate.

In order to achieve the object set forth, a preferred embodiment of the present invention includes a casing, a supporting frame, a central shaft, a rotor assembly, an outer actuating assembly, and an actuating device. The rotor assembly is coupled with the central shaft and rotatable with the central shaft about a central axis of the central shaft. The rotor assembly is provided with a plurality of fixed rotor magnets supported by a fixed rotor magnet supporting mechanism to the rotor assembly. An outer actuating assembly is arranged around the rotor assembly, comprising a plurality of movable outer magnets spaced by baffle plates from each other. The actuating device is mechanically coupled to the outer actuating assembly for moving the movable outer magnets of the outer actuating assembly toward or backward the fixed rotor magnets of the rotor assembly so as to magnetically actuate the rotor assembly to rotate.

According to another aspect of the present invention, each of the fixed rotor magnets has an inclined angle with respect to the central axis of the central shaft. The movable outer magnet is formed with an inclined angle correspondingly opposite to the fixed rotor magnet mounted on the rotor assembly.

According to another aspect of the present invention, each of the fixed rotor magnets has an inclined end facing the movable outer magnets, and each of the movable outer magnets has an inclined end facing the fixed rotor magnets.

To further understand the present invention, reference is made to the following detailed description of a preferred embodiment of the present invention, as well as the attached drawings, wherein:

DETAILED DESCRIPTION OF THE PREFERRED EMBODIMENTS

Figure 1:
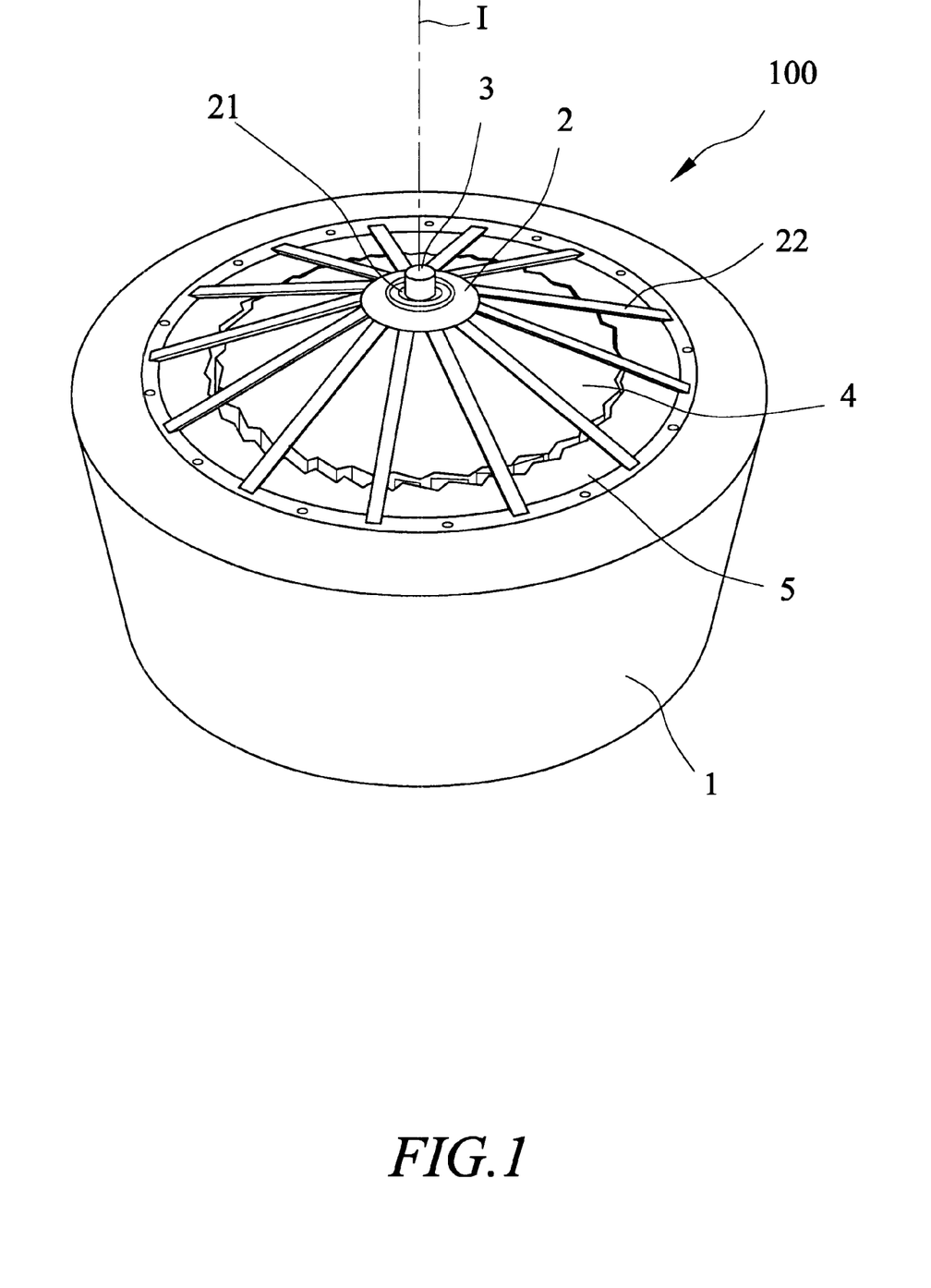
FIG. 1 is a perspective view of the mechanically actuated rotary apparatus in accordance with the present invention.

Referring to FIG. 1, there is shown a perspective view of the magnetically actuating rotary apparatus 100 in accordance with the present invention. The magnetically actuating rotary apparatus 100 includes a casing 1, a central shaft 2, a supporting frame 3, a rotor assembly 4, and an outer actuating assembly 5. The central shaft 2 is protruded on a central hole 21 of the supporting frame 3. The supporting frame 2 is provided with a number of connection plates 22 arranged in a radial direction from the central hole 21 of the supporting frame 2 to the casing 1. So, the central shaft 3 may be rotatably positioned in the casing 1 by means of the supporting frame 2. The rotor assembly 4 is mounted with the central shaft 2 and may be rotatable with the central shaft 3 about a central axis I of the casing 1.

Figure 2:
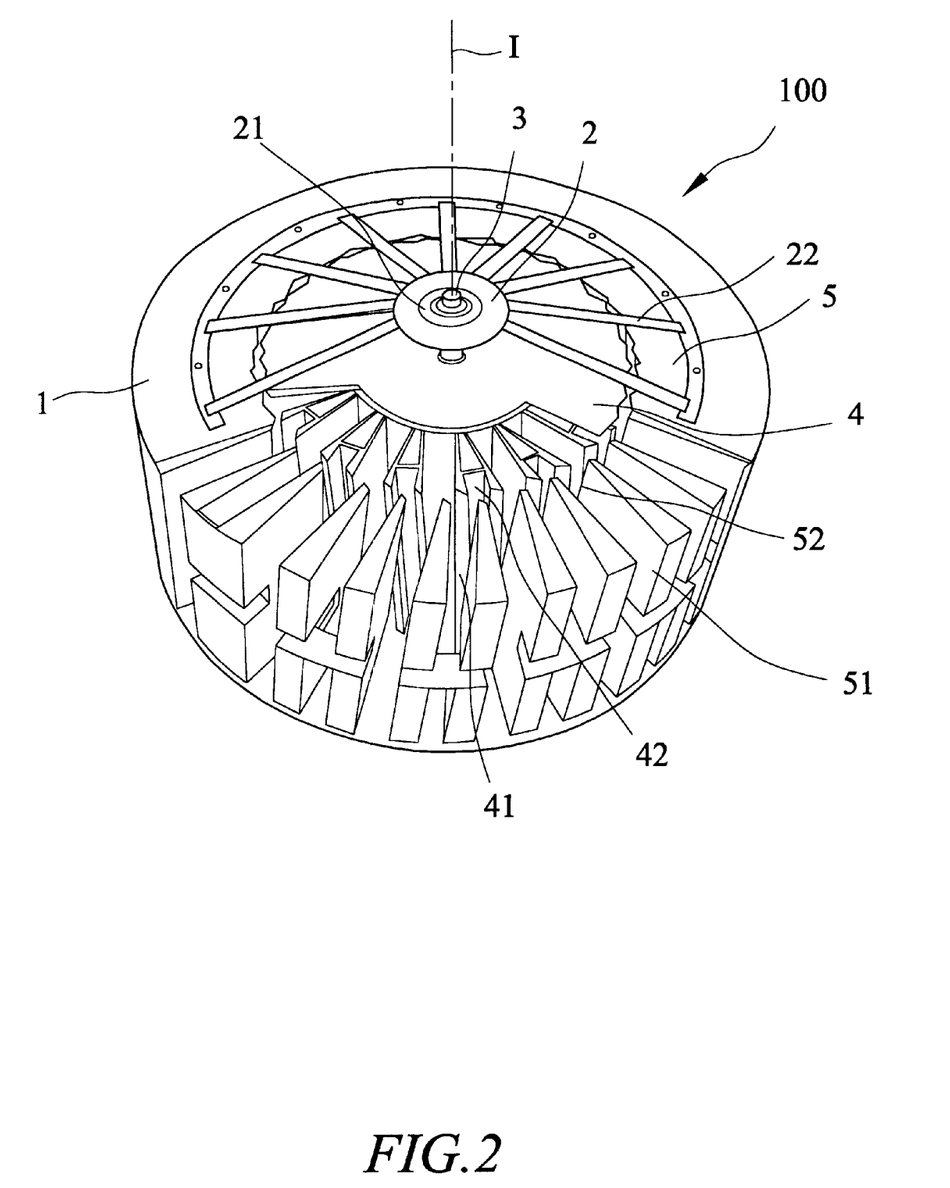
FIG. 2 a perspective view of the present invention, further showing the structure of the rotor assembly and the outer actuating assembly.
Figure 3:
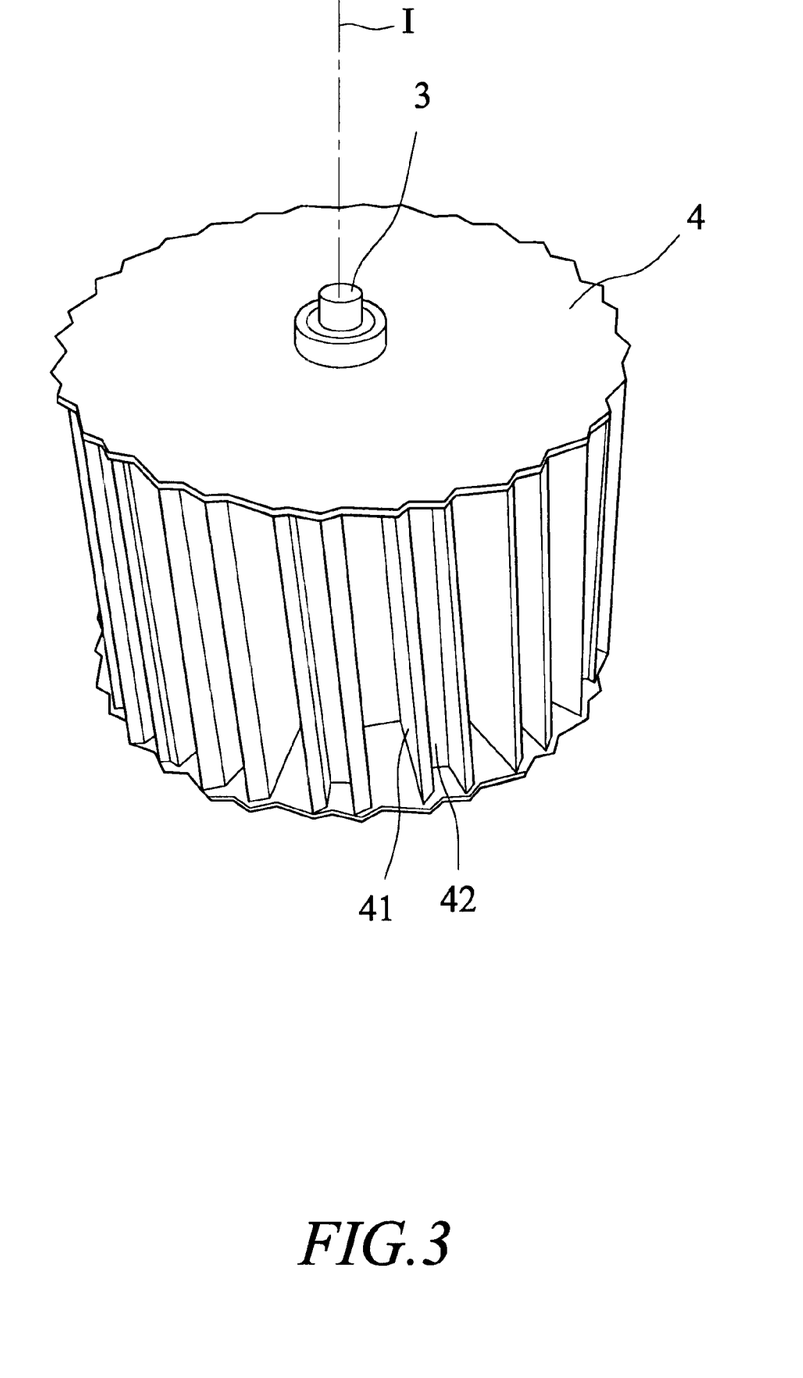
FIG. 3 shows a perspective view of the rotor assembly of the present invention.

With reference to FIG. 2, it is a perspective view of the present invention, showing the structure of the rotor assembly 4 and the outer actuating assembly 5. FIG. 3 shows a perspective view of the rotor assembly 4. As shown in the drawing, the rotor assembly 4 includes a number of radially extended wedges 41, and each of the radially extended wedge 41 is provided with a longitudinal slot 42 at its outward open end. The longitudinal slot 42 is extended in a direction parallel to the central axis I of the central shaft 3.

In a preferred embodiment of the present invention, the longitudinal slot 42 is formed with an inclined angle of about 10~15 degrees with respect to the central axis I of the central shaft 3.

Figure 4:
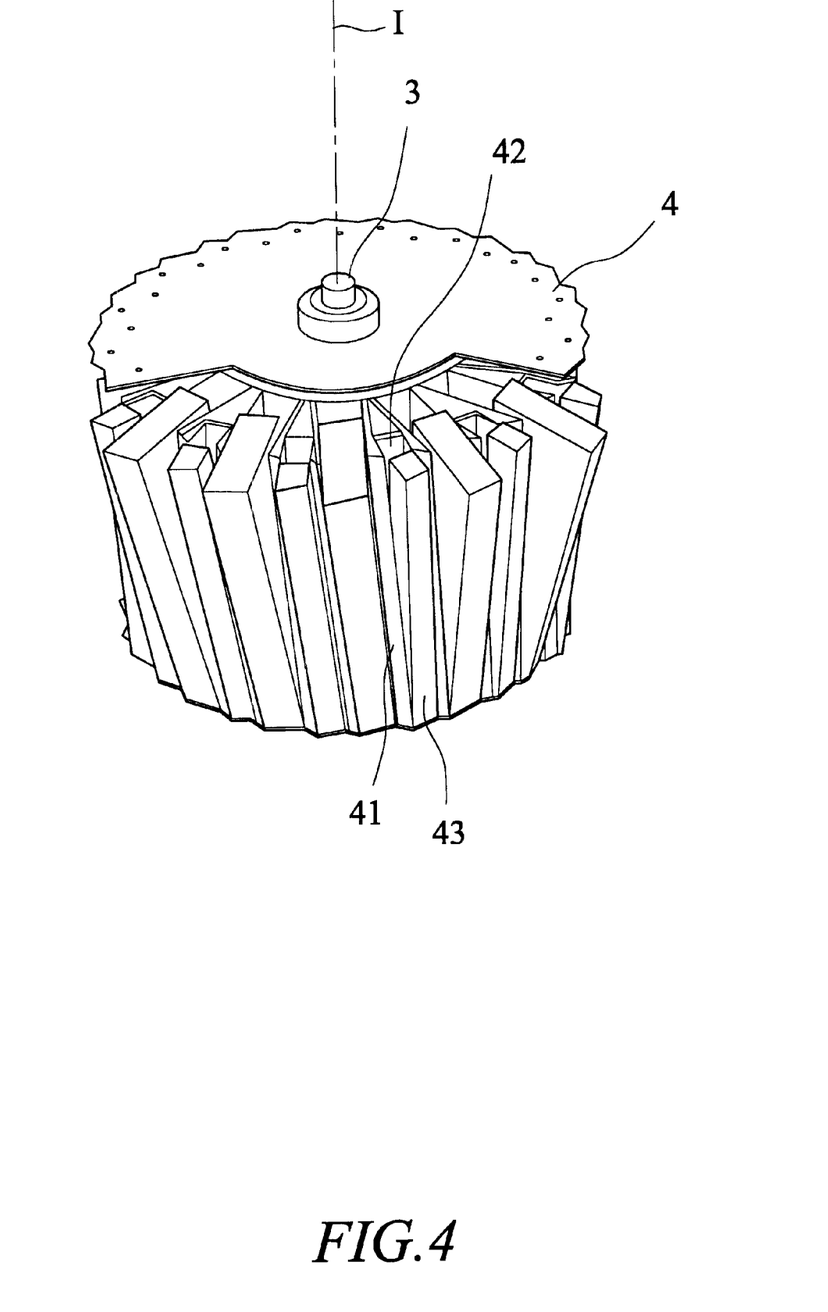
FIG. 4 is a perspective view showing a number of fixed rotor magnets may be mounted in the longitudinal slot of the radially extended wedge of the rotor assembly.

Further, as shown in FIG. 4, the longitudinal slot 42 of the radially extended wedge 41 is mounted with a fixed rotor magnet 43. So, the fixed rotor magnet 43 has an inclined angle after mounted into the longitudinal slot 42 of the extended wedge 41. The radially extended wedge 41 serves as a rotor magnet supporting mechanism of the rotor assembly 4. Each fixed rotor magnet 43 has an inclined outward open end 44 with an inclined angle of 10~15 degrees at its outward open end.

Figure 5:
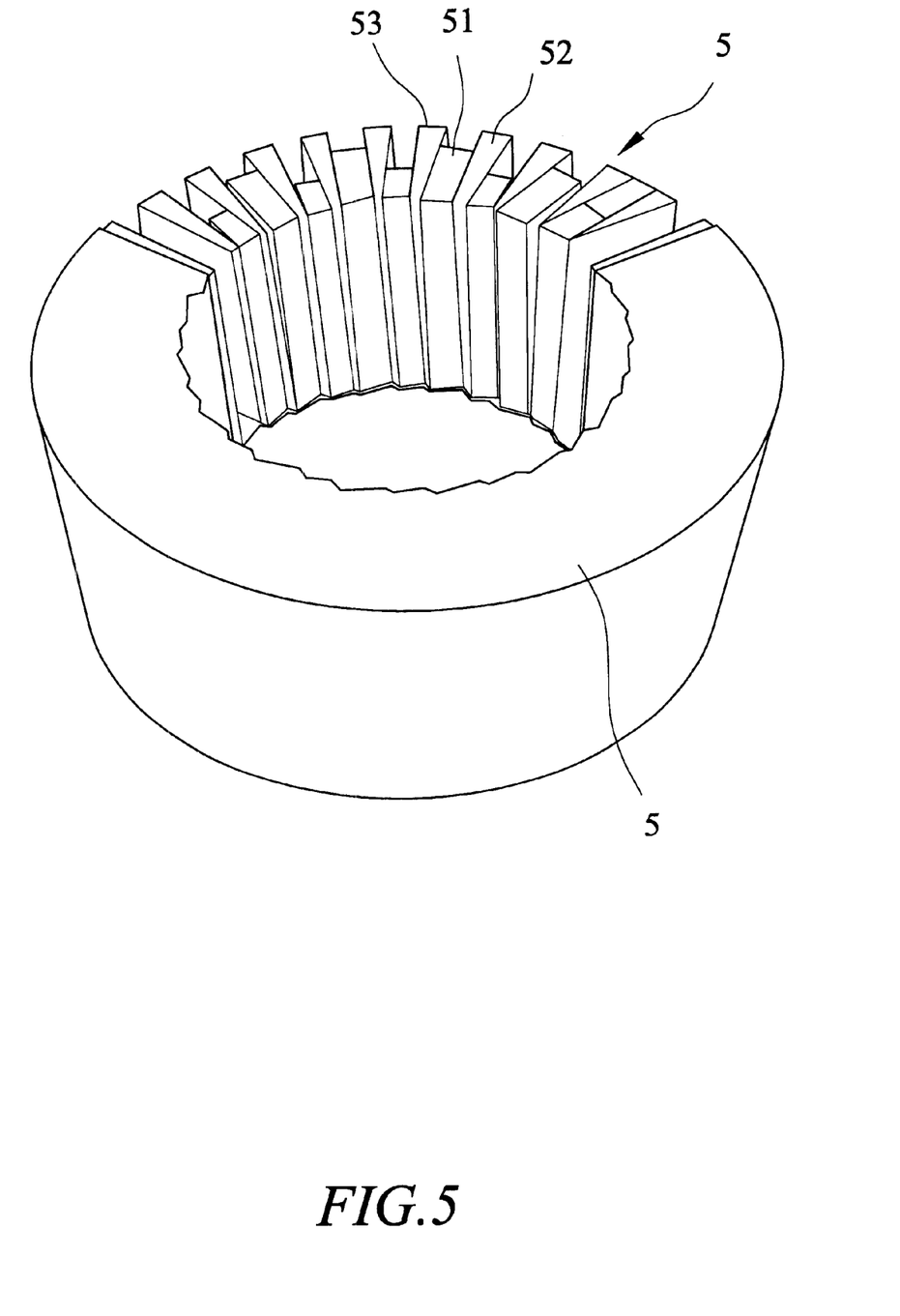
FIG. 5 is a perspective view of the outer actuating assembly of the present invention.

With reference to FIG. 5, it is a perspective view of the outer actuating assembly 5, which includes a number of movable outer magnets 51. Each movable outer magnet 51 is spaced by baffle plate 52 from each other. The movable outer magnet 51 is formed with an inclined angle of 10~15 degrees, correspondingly opposite to the fixed rotor magnet 43 mounted on the rotor assembly 4. Further, each movable outer magnet 51 has an inclined inward open end 53 with an angle of 10~15 degrees.

Figure 6:
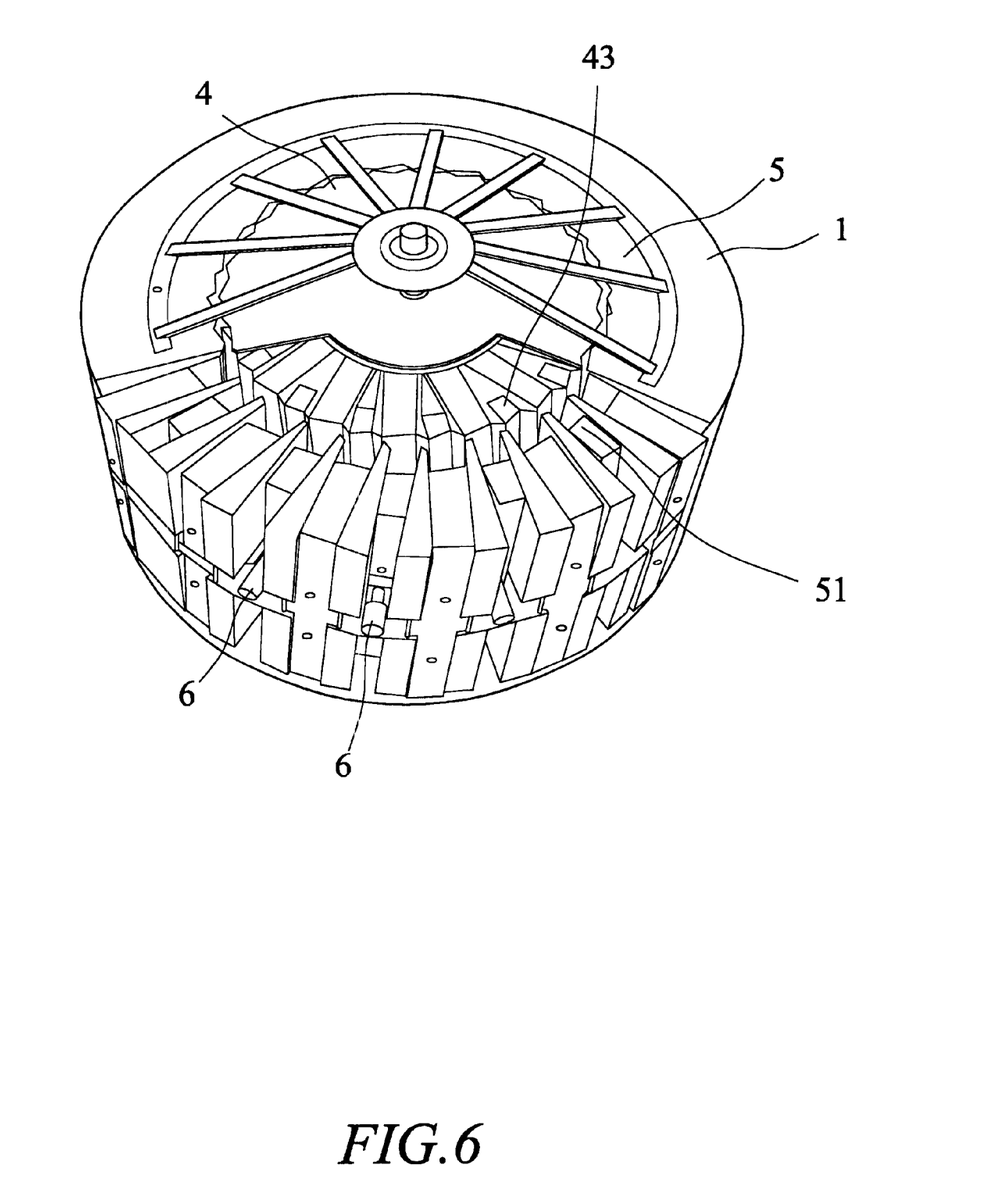
FIG. 6 is a perspective view of the present invention, showing the fixed rotor magnet of the rotor assembly is inclined with respect to the movable outer magnet of the outer actuating assembly, and a number of actuating devices are mechanically coupled the outer actuating assembly.

FIG. 6 is a perspective view of the present invention, showing the fixed rotor magnet 43 of the rotor assembly 4 is inclined at its outward open end with respect to the movable outer magnet 52 of the outer actuating assembly 5, and a number of actuating devices 6 are mechanically coupled the outer actuating assembly 5. Preferably, the surface of the outward open end of the fixed rotor magnet 43 of the rotor assembly 4 is parallel to that of the inward open end 53 of the movable outer magnet 51 of the outer actuating assembly 5.

The actuating devices 6 are mechanically coupled the outer actuating assembly 4, capable of moving the movable outer magnets 51 toward or backward the fixed rotor magnet 43.

Figure 7:
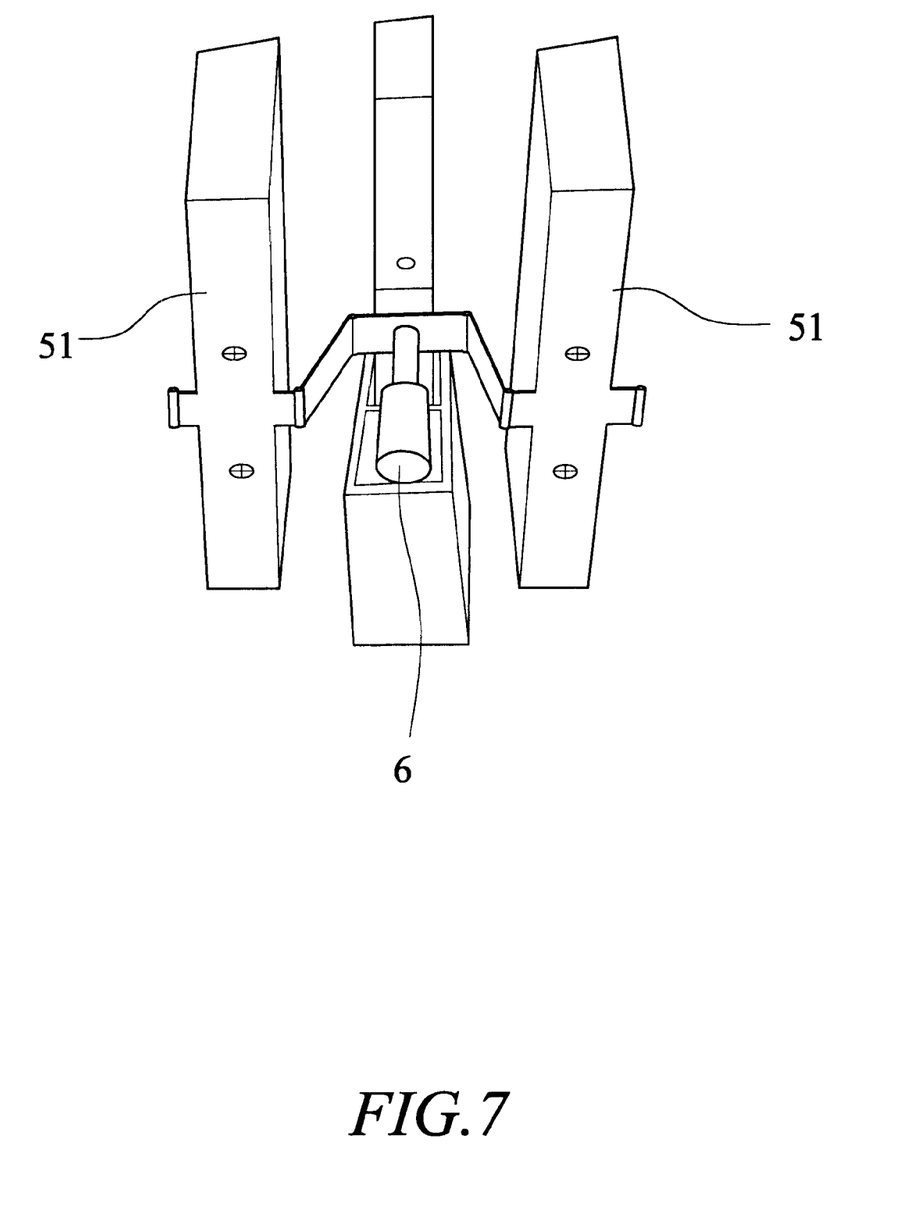
FIG. 7 is a rear perspective view of the actuating device of FIG. 6 in more detail.
Figure 8:
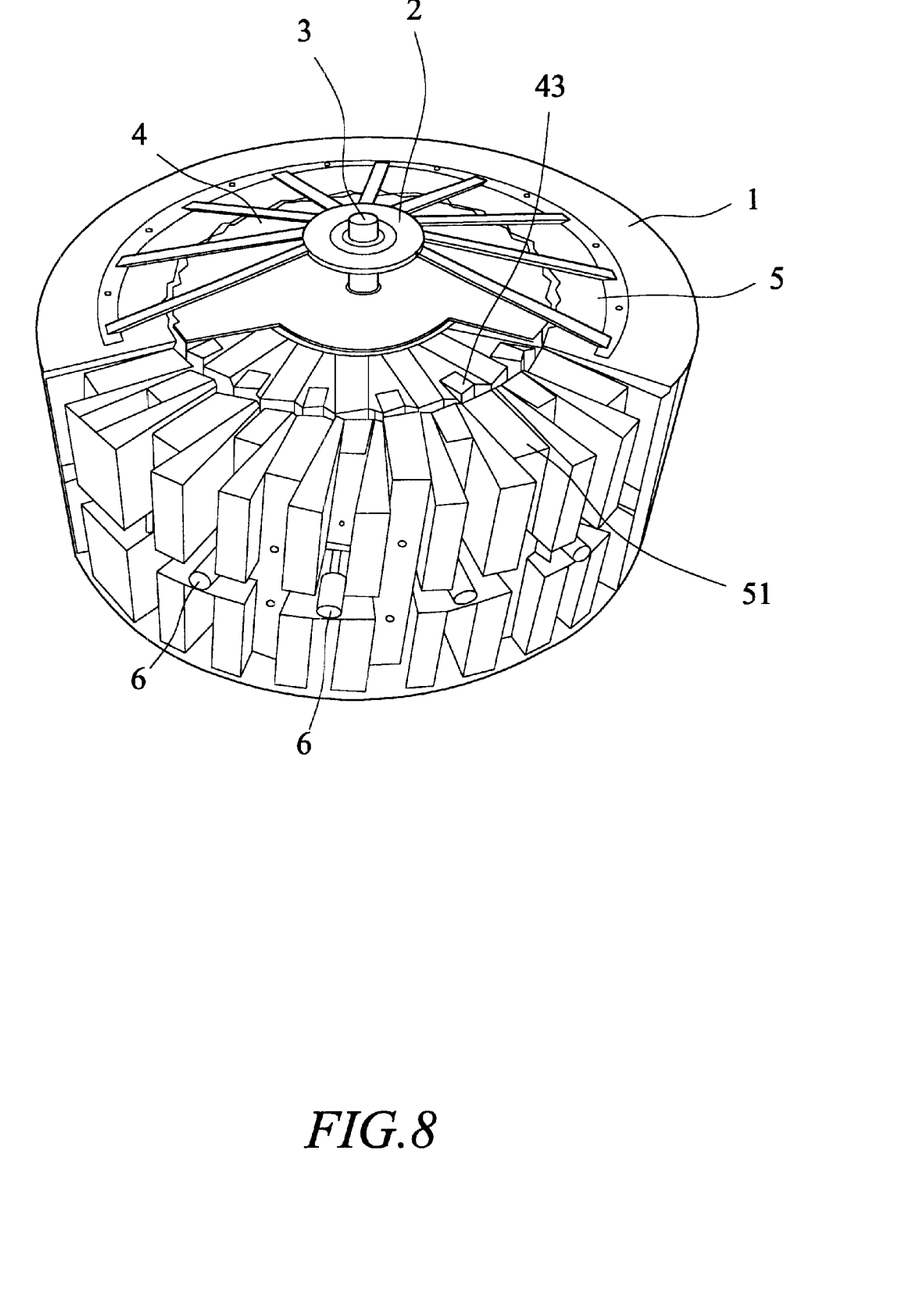
FIG. 8 is a perspective view showing the movable outer magnets of the outer actuating assembly are moved toward the fixed rotor magnets of the rotor assembly by means of the actuating device.

FIG. 7 is a rear perspective view of the actuating device 6 of FIG. 6 in more detail. The actuating device 6 may be a driving motor, a stepping motor, hydraulic driving apparatus, magnetically control actuator, and so on. When the actuating device 6 is actuated, the movable outer magnets mechanically coupled to the actuating device 6 are simultaneously moved toward or backward the rotor assembly 4. FIG. 9 is a perspective view showing the movable outer magnets 51 of the outer actuating assembly 5 are moved toward the fixed rotor magnets 43 of the rotor assembly 4 by means of the actuating device 6.

In operation, the rotor assembly 4 may be actuated to rotate by means of supplying an electric power source to the actuating device 6, thereby generating a magnetic force between the outer actuating assembly 5 and the rotor assembly 4. Therefore, the rotor assembly 4 will be rotated by the magnetic force. Besides, due to the outward open end of the fixed rotor magnet of the rotor assembly has an inclined angle and is parallel to inward open end of the movable outer magnet of the outer actuating assembly, and the fixed rotor magnet has an opposite inclined angle with respect the movable outer magnet of the outer actuating assembly, the rotor assembly can rotate smoothly.

In this arrangement, the rotation speed of the rotor assembly may be simply changed by controlling the actuating device to move the movable outer magnet of the outer actuating assembly toward or backward the rotor assembly.

While the present invention has been described with reference to the specific embodiment, the description is illustrative of the invention and is not to be construed as limiting the invention. Therefore, various modifications to the present invention can be made to the preferred embodiments by those skilled in the art without departing from the true spirit and scope of the invention as defined by the appended claims.

I claim:

1. A magnetically actuated rotary apparatus comprising:

a casing;

a supporting frame coupled with the casing, defining an inner space therein between the casing and the supporting frame, having a central hole;

a central shaft, supported by the central hole of the supporting frame;

a rotor assembly coupled with the central shaft and rotatable with the central shaft about a central axis of the central shaft, the rotor assembly comprising a plurality of fixed rotor magnets supported by a fixed rotor magnet supporting mechanism to the rotor assembly, each of the fixed rotor magnets having an inclined angle with respect to the central axis of the central shaft;

an outer actuating assembly arranged around the rotor assembly, comprising a plurality of movable outer magnets spaced from each other, the movable outer magnet being formed with an inclined angle correspondingly opposite to the fixed rotor magnet mounted on the rotor assembly; and an actuating device mechanically coupled to the outer actuating assembly for moving the movable outer magnets of the outer actuating assembly toward or backward the fixed rotor magnets of the rotor assembly so as to magnetically actuate the rotor assembly to rotate.

2. The magnetically actuated rotary apparatus as recited in claim 1, wherein the fixed rotor magnet supporting mechanism comprises a plurality of radially extended wedges extended from the central shaft in a radial direction, each of the extended wedges being provided with a longitudinal slot extended in a direction parallel to the central shaft, and each longitudinal slot being mounted with a fixed rotor magnet.

3. The magnetically actuated rotary apparatus as recited in claim 2, wherein the fixed rotor magnet has an inclined angle with respect to the central shaft.

4. The magnetically actuated rotary apparatus as recited in claim 2, wherein the movable outer magnet has an inclined angle correspondingly opposite to the fixed rotor magnet mounted on the rotor assembly.

5. The magnetically actuated rotary apparatus as recited in claim 1, each of the fixed rotor magnets having an inclined end facing the movable outer magnets.

6. The magnetically actuated rotary apparatus as recited in claim 1, each of the movable outer magnets having an inclined end facing the fixed rotor magnets.

* * * * *